United States Patent [19]
Hardman et al.

[11] Patent Number: 6,067,579
[45] Date of Patent: May 23, 2000

[54] METHOD FOR REDUCING MESSAGE TRANSLATION AND TRAFFIC THROUGH INTERMEDIATE APPLICATIONS AND SYSTEMS IN AN INTERNET APPLICATION

[75] Inventors: Neil R. Hardman, Romsey, United Kingdom; Alan J. Hopkins, Phoenix; Hoyt L. Kesterson, Glendale, both of Ariz.; Steven A. Millington, Southampton; Robert F. Nugent, Eastleigh, both of United Kingdom

[73] Assignee: Bull HN Information Systems Inc., Billerica, Mass.

[21] Appl. No.: 08/868,178

[22] Filed: Jun. 3, 1997

Related U.S. Application Data

[60] Provisional application No. 60/044,593, Apr. 22, 1997.

[51] Int. Cl.$^7$ .............................. G06F 9/00; G06F 15/16
[52] U.S. Cl. ............................................. 709/328; 709/203
[58] Field of Search ........................ 395/185.01, 185.05, 395/185.1, 200.33, 682, 853, 200.47, 200.48, 200.49; 345/335, 356, 357; 707/501, 513; 709/217, 218, 219, 227, 245

[56] References Cited

U.S. PATENT DOCUMENTS

| | | | |
|---|---|---|---|
| 3,800,281 | 3/1974 | Devore et al. | 340/146.1 |
| 5,440,699 | 8/1995 | Farrand et al. | 395/155 |
| 5,550,984 | 8/1996 | Gelb | 709/245 |
| 5,551,030 | 8/1996 | Linden et al. | 395/600 |
| 5,604,487 | 2/1997 | Frymier | 340/825.07 |
| 5,754,830 | 5/1998 | Butts et al. | 395/500 |
| 5,761,499 | 6/1998 | Sonderegger | 395/610 |
| 5,768,510 | 6/1998 | Gish | 395/200.33 |
| 5,778,368 | 7/1998 | Hogan et al. | 707/10 |
| 5,781,739 | 7/1998 | Bach et al. | 709/227 |
| 5,802,530 | 9/1998 | Van Hoff | 707/513 |

*Primary Examiner*—Mark H. Rinehart
*Assistant Examiner*—Marc D. Thompson
*Attorney, Agent, or Firm*—B. E. Hayden; J. S. Solakian

[57] ABSTRACT

A mapping between terminal presentation and a Graphical User Interface to an end user using a web browser is provided. The mapping representation is created to support a selected screen image sent from the application to the web browser. A generic interpretative applet and the screen mapping representation is forwarded to a web server and in turn is downloaded to a web browser using a well known protocol. The applet generates and processes messages in an acceptable presentation, e.g. IBM 3270 format, and exchanges those messages directly with a receiving application across a computer network, thereby reducing or eliminating message translation and traffic through intermediate applications and systems.

12 Claims, 3 Drawing Sheets

Prior Art   Fig. 1

METHOD FOR REDUCING MESSAGE TRANSLATION AND TRAFFIC THROUGH INTERMEDIATE APPLICATIONS AND SYSTEMS IN AN INTERNET APPLICATION

This patent application claims the benefit of Provisional Application Ser. No. 60/044,593, filed on Apr. 22, 1997.

BACKGROUND OF THE INVENTION

1. Field of Use

The present invention relates to Internet-accessible applications and more particularly to a method for reducing or eliminating message translation and traffic through intermediate applications and systems in an internet application.

2. Prior Art

With the increasing popularity of internet web browsers, there is an increasing need to allow those browsing applications to access the applications in enterprise systems, in particular transaction processing (TP) and other applications on middle-range or enterprise mainframe systems. The problem is that the applications programs in most TP systems are expecting messages that look as if they were generated by a terminal such as an International Business Machines (IBM) 3270 terminal. These terminals can display information organized in both non-modifiable output-only static fields and user/application-specific modifiable input/output variable fields on the screen. The static fields typically provide documentary or prompt information while the variable fields provide data entry and data output specific to a particular application dialog interface. The template that controls that screen layout organization is often called a form, a map, or a screen image. Screen images are downloaded into the terminal over normal communications through an ordered data stream when required. The end user enters data into the variable fields of the screen image. Only the modified variable-field data is transmitted to the application. There is varied and extensive practice in the specification, generation, and transmission of screen images. To avoid changing the current screen images and applications on the middle-range or enterprise system, the PC desktop platforms masquerade as a traditional terminal when talking to those applications. On personal computers this normally has been done by terminal emulation software that can generate messages that are identical to those generated by a real terminal (e.g. the PC application exchanges messages encoded in 3270 presentation format).

For the emerging web browser and server environment, this is currently done by having the browser software send a message to a web server. Web server extensions (enabled by standard web server programmatic interfaces) are provided by companies that translate the message to a format identical to the format that would be generated by a 3270 terminal, and passes it on to an application residing in the same system. The receiving application may process the message or it may pass the message on to a mainframe TP to be processed there.

Although this broadens the type of end systems with which the application can communicate, it may not offer acceptable performance, throughput and response time in a high volume transaction environment. Each message is translated in the web server extension and possibly in the intermediate application. In addition, the message is forced to be routed through several applications and an intermediate system. If the application in the intermediate system (e.g. the UniKix product offered by UniKix Technologies) does not provide services like providing a platform for rehosting legacy TP applications or providing an integrating view of several TP applications or systems, it is merely acting as a costly message router.

SUMMARY OF THE INVENTION

It is therefore a primary object of the present invention to reduce or eliminate message translation and traffic through intermediate applications and systems in an internet application.

A relatively small computer program application, i.e. applet, is created to support mapping the screen images associated with a transaction processing application to a modern, intuitive Graphical User Interface (GUI). The applet is designed to translate input entered by a user into the format expected by the application.

Intermediate message translation is eliminated by having the browser application applet generate and process messages that are understood by the mainframe application (e.g. messages in a 3270 presentation). In addition, these messages would be encapsulated in a TCP/IP protocol message to be routed directly to the mainframe TP application (or any application prepared to exchange messages in, for example, a 3270 presentation).

The applet also translates replies received from the application screen image format (e.g. messages in a 3270 presentation) into a format that can be presented to and understood by the user.

BRIEF DESCRIPTION OF THE DRAWINGS

These and other features of the invention will be understood with reference to the following description and the drawings, in which.

DETAILED DESCRIPTION OF THE INVENTION

Figure 1:
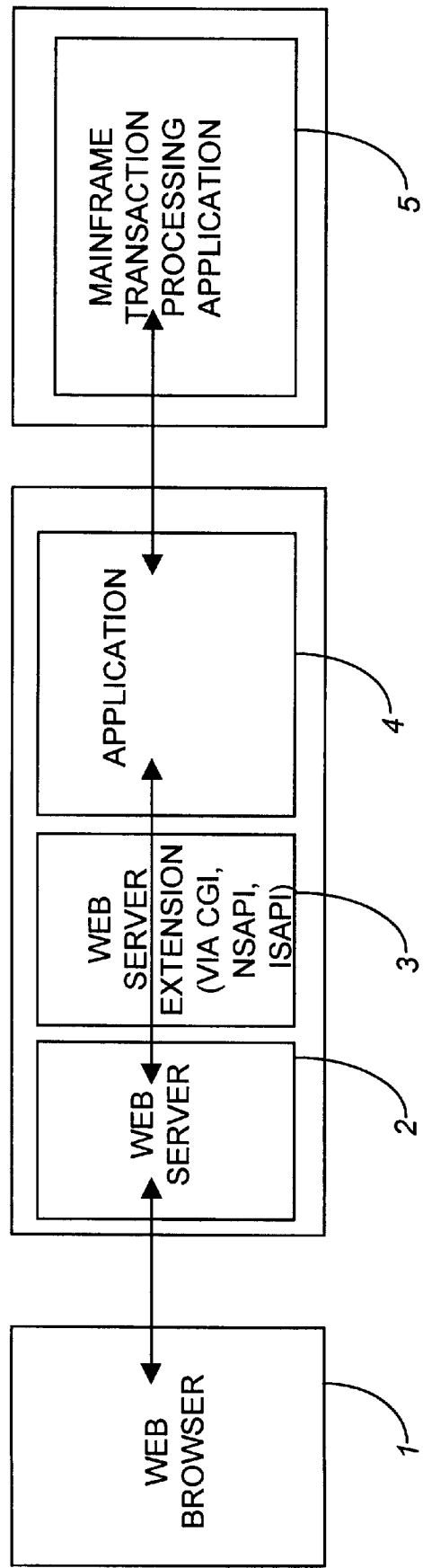
FIG. 1 shows a schematic diagram of components of a system representing the prior art.

FIG. 1 shows a schematic diagram of the current art for web browsers acting as terminal emulators for the purpose of specifying, generating and the downloading of forms. This is currently done by having the browser software 1 communicate in its normal fashion by sending a message to a web server 2. The web server 2 then invokes a web server extension 3 to translate the message to an acceptable format (e.g. a transaction message in 3270 presentation format), and passes it on to an application 4 residing in the same or different system. This web server extension is often enabled using the standard Common Gateway Interface (CGI), Netscape interface (NSAPI), or Microsoft interface (ISAPI). The web server extension interacts with an application 4 on either the same or different computer system. The receiving application 4 may process the message or it may pass the message on to a mainframe computer having application software such as mainframe transaction processing (TP) application 5. It can be seen that intermediate message translation is required for each message in the web server extension 3 in order to provide an acceptable format of information for the applications 4 and 5, thereby increasing response time in the system.

Figure 2:
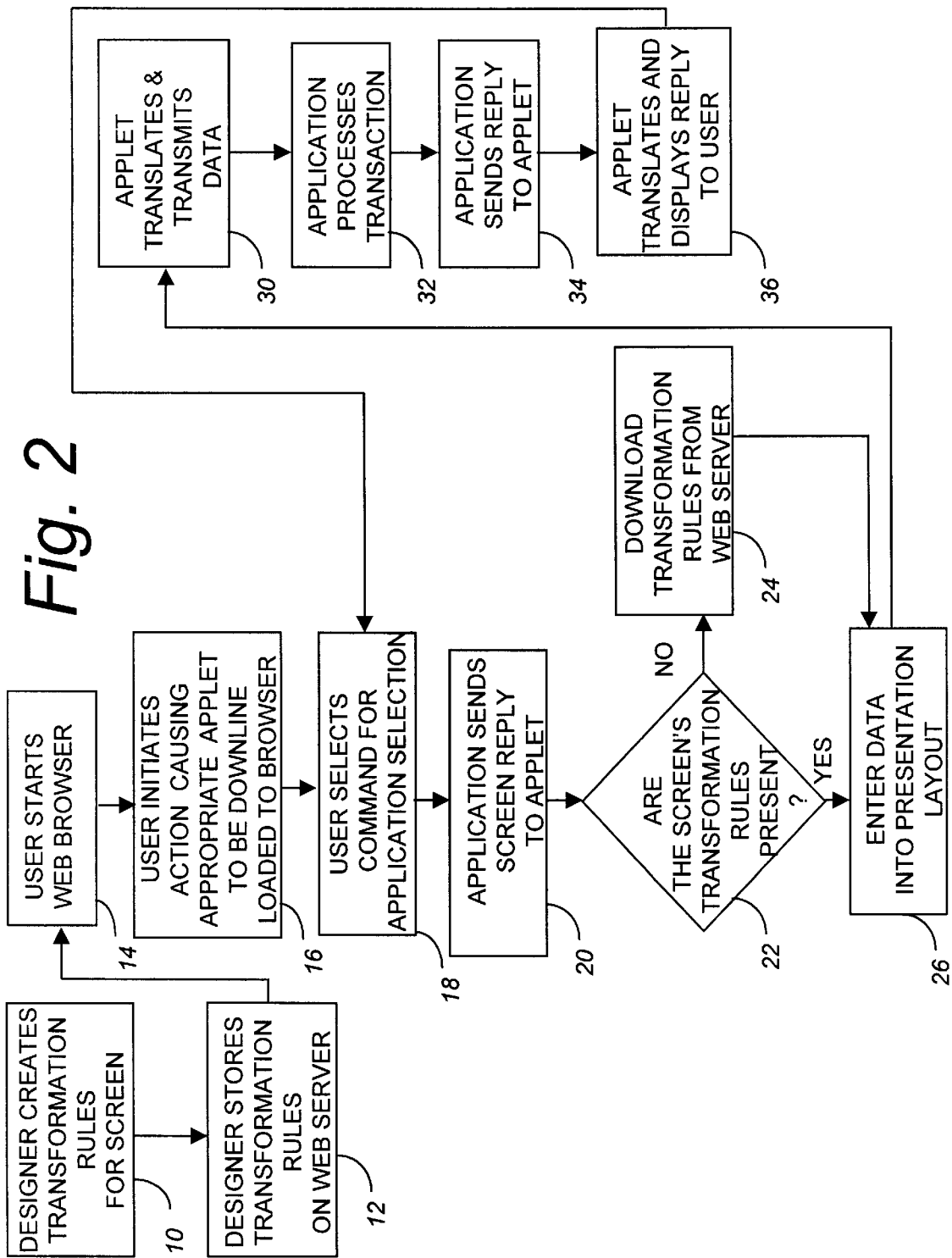
FIG. 2 shows a flow chart of the operation of a system according to one embodiment of the present invention.

FIG. 2 shows a flow chart of the operation of a system according to one embodiment of the present invention. A designer optionally uses a tool to generate a set of transformation rules to convert the information exchanged between the GUI seen by the end user and the terminal data stream known by the target transaction processing or other application (block 10) for a selected screen image. The set of transformation rules describe how to map the differences between the field types of the GUI interface and of the terminal data stream. The rules may also specify validation rules, e.g. a field must be a positive integer less than 100. The rules may also provide input assistance, e.g. a list of permissible values for a field that the GUI may present as a drop down menu. The designer stores the set of transformation rules on the web server (block 12). The rules may be stored as part of a specialized applet or as a discrete object set that could be retrievable by a more generalized applet.

An end user of the application then starts the web browser (block 14) and, via an interface appropriate to the browser, initiates an action that results in the selection of an applet which may be transparently downline loaded (block 16). For example, the action could select a Uniform Resource Locator (URL) and a list of options with the user clicking on an HTML field tag to initiate the transparent downline load of an applet. This applet and its related configuration connects directly to the target application environment or to an intermediate environment that can connect to the target application environment. The end user initiates the desired application command (block 18) to the application. The transaction processing or other application sends a screen image over a data stream to prompt the user for related interaction (block 20).

The modifiable variable fields of the screen image may be presented to the user in a variety of ways. For example, if the user were a "heads-down" data entry operator, the screen presentation and keyboard actions would mimic the legacy terminal characteristics and would appear as the traditional terminal presentation. However, for those screens for which a designer has defined a more detailed set of transformation rules, the applet could optionally map the field to the more sophisticated graphical user interface (GUI) facilities of the browser, e.g. drop down menu selection. In addition, the applet could examine the input data entered by the user for correctness. The traditional terminal form already does this in that it can do simple syntactic checks (e.g. check that field is all numeric). However, the applet could be expanded to do many of the types of checks done by the TP application, thereby off-loading some processing.

If the set of transformation rules associated with this screen is not contained in the applet, i.e. the generic applet is in use, and is not present (block 22) on the web browser, but is present on the web server, then it is downloaded from the web server to the web browser (block 24) and the user enters data into the presentation layout (block 26). The applet then processes this data and translates it into a message format that is acceptable to the application and transmits it to the application (block 30).

The application processes the request (block 32) and sends a reply to the applet (block 34). The applet translates the reply into a format acceptable to the web browser and displays it to the user (block 36).

The process then repeats when the user selects an application command (block 18), and continues until the set of applications selected for execution are completed.

Figure 3:
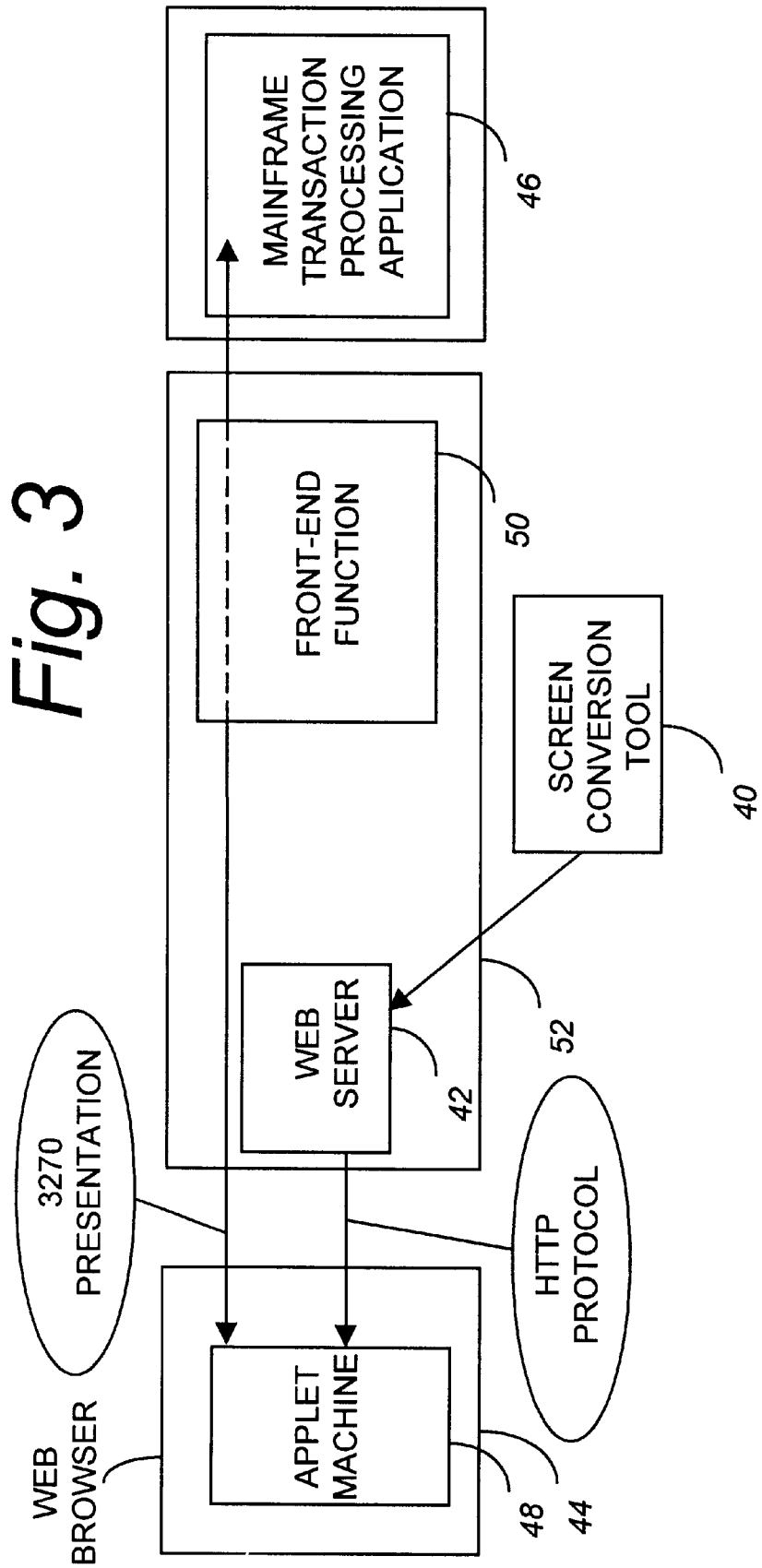
FIG. 3 shows a schematic diagram of components of the present invention.

FIG. 3 shows a schematic diagram of components of the present invention. The set of transformation rules to guide conversion between the end user presentation interface and the application data stream expectations is optionally created using a screen capture and visual editing tool (block 40). This set of transformation rules is forwarded to the web server (block 42). The rules are either held as a discrete object or are bound into a specialized applet. Either the specialized applet providing specific, or an applet providing generic, conversion between terminal data stream and end user presentation expectations is downloaded from the web server (block 42) to the web browser (block 44) using well known browser/server technology and well known Hypertext Transfer Protocol (HTTP). It is noted that the applet and the screen transformation rules can be cached in the browser by the applet machine (block 48) to increase performance. Security restrictions in current applet technology, e.g. Java software of Sun Microsystems, mandate that the messages sent from the applet machine (block 48) using the 3270 presentation format and TCP/IP protocol, can only be directed to the system (block 52) that contains the web server (block 42) that provided the applet. This may mandate that the web server (block 42) be placed on the front-end system (block 50) or directly on the mainframe (block 46) so that the messages transmitted by the applet on the browser can be routed to the appropriate IBM, Bull or another manufacturer's mainframe (block 46). Note that if the web server is not on the target application machine, the message is always required to travel through the system holding the web server. However, if that system is also acting as the front-end to the target application machine, this does not introduce any additional intermediate systems to be traversed by the message.

It will be apparent to those skilled in the art that many changes may be made to the preferred embodiment of the present invention.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A method for reducing or eliminating message translation and traffic through intermediate applications and systems in an internet application, said method comprising the steps of:

A. creating an auxiliary computer program application that constructs a mapping between a screen image associated with a main computer program application and a screen presentation made to an end user on a standard web browser;

B. enabling a browser applet application to generate and process messages that are understood by the main computer program application; and C. enabling the browser applet application to translate a screen image reply received from the main computer program application into a format that can be presented to and understood by the end user on the standard web browser utilizing the mapping constructed in step (A).

2. A method as in claim 1 further comprising the step of:
   enabling the browser applet application to apply enhanced data checks and presentation formats to the end user.

3. A method for browsing in a computer network having a main computer, a web server, a web browser, at least one screen for input/output purposes, and an auxiliary applet application, said method comprising the steps of:

A. storing on said web server said auxiliary applet application which can support a selected one of said screens for input/output purposes;

B. initiating a main application in said main computer;

C. entering data into said selected one of said screens;

D. processing said data on one of said screens by means of said auxiliary applet application, said auxiliary applet application providing a mapping between a format of said one of said screens and a screen format expected by said main application; and E. transmitting said data to said main application for processing.

4. The method of claim 3 wherein said step of processing includes the substep of:

translating said data into a message format which is acceptable to said main application.

5. The method of claim 4 further comprises the additional steps of:

F. sending a reply from the main application to said auxiliary applet application in response to the receipt of said data by said main application; and G. processing said reply by means of said auxiliary applet application.

6. The method of claim 5 wherein said step of processing said reply includes the substep of:

translating said reply into a format acceptable to said web browser; and displaying said reply to an end user.

7. The method of claim 6 wherein said translating step is performed by said auxiliary applet application.

8. A method as in claim 3 further comprising the step of:

F. enabling the auxiliary applet application to apply enhanced data checks and presentation formats to an end user.

9. The method in claim 4 wherein:

the message format is IBM 3270 format.

10. The method in claim 1 wherein:

the main application understands IBM 3270 format messages, and the format that can be presented to and understood by the end user is HTTP.

11. The method in claim 1 wherein:

the auxiliary computer application maps between IBM 3270 format images and HTTP.

12. The method in claim 1 wherein:

the auxiliary computer application maps between IBM 3270 format images and HTML.

* * * * *